(12) United States Patent
Larink et al.

(10) Patent No.: US 12,173,794 B2  
(45) Date of Patent: Dec. 24, 2024

(54) SEALING ARRANGEMENT FOR A CONNECTION BETWEEN TWO CONNECTING ELEMENTS OF AN OFFSHORE STRUCTURE AND METHOD FOR PRODUCING SAME

(71) Applicant: Rosen Swiss AG, Stans (CH)

(72) Inventors: Dirk Larink, Bad Bentheim (DE); Hanna Krümpel, Neuenkirchen (DE); Alexander Lindner, Ochtrup (DE)

(73) Assignee: Rosen 2 Holding AG, Stans (CH)

( * ) Notice: Subject to any disclaimer, the term of this patent is extended or adjusted under 35 U.S.C. 154(b) by 1019 days.

(21) Appl. No.: 16/755,646

(22) PCT Filed: Oct. 12, 2018

(86) PCT No.: PCT/EP2018/077946  
§ 371 (c)(1),  
(2) Date: Oct. 20, 2020

(87) PCT Pub. No.: WO2019/073060  
PCT Pub. Date: Apr. 18, 2019

(65) Prior Publication Data  
US 2021/0018093 A1 Jan. 21, 2021

(30) Foreign Application Priority Data  
Oct. 13, 2017 (DE) .................. 10 2017 123 935.9

(51) Int. Cl.  
F16J 15/02 (2006.01)  
E02B 17/00 (2006.01)  
E02D 5/52 (2006.01)

(52) U.S. Cl.  
CPC ............. *F16J 15/02* (2013.01); *E02B 17/00* (2013.01); *E02B 2017/0091* (2013.01);  
(Continued)

(58) Field of Classification Search  
CPC .......... F16J 15/02; F16J 15/021; F16J 15/022; E02B 17/00; E02B 2017/0091;  
(Continued)

(56) References Cited

U.S. PATENT DOCUMENTS

| 5,149,108 A | 9/1992 | Leiszter |
| 8,083,237 B2 * | 12/2011 | Smith .................. F16L 21/002 |
| | | 277/648 |

(Continued)

FOREIGN PATENT DOCUMENTS

| CN | 201293743 Y | 8/2009 |
| CN | 201381949 Y | 1/2010 |

(Continued)

OTHER PUBLICATIONS

International Search Report mailed Apr. 16, 2019 (PCT/EP2018/077946).

(Continued)

*Primary Examiner* — Gilbert Y Lee  
(74) *Attorney, Agent, or Firm* — Alix, Yale & Ristas, LLP

(57) ABSTRACT

Seal arrangement for a joint of two joint elements, in particular realized as a monopile and a transition piece, of an offshore structure, preferably an offshore wind energy installation, in particular a substructure thereof, in which, for the purpose of producing a stable joint, an upper joint element and a lower joint element are inserted into each other in a clamping manner by means of at least one seal unit, comprising one of the joint elements and the at least one seal unit fixed to the joint element, in such a manner that the seal unit, in a joining position, is arranged between an inner joint surface of one joint element and an outer joint surface of the other joint element, at least one seal unit having at least one elastic sealing element, which extends in the circumferential (Continued)

direction around the entire circumference and the thickness (D) of which is greater than the thickness (D') of an adjoining seal unit region and method for producing a seal arrangement.

21 Claims, 10 Drawing Sheets

(52) U.S. Cl.
CPC ...... *E02D 5/526* (2013.01); *E02D 2300/0001* (2013.01); *E02D 2300/0006* (2013.01); *E02D 2300/0007* (2013.01); *E02D 2300/0009* (2013.01); *E02D 2300/001* (2013.01); *E02D 2300/0014* (2013.01); *E02D 2300/0017* (2013.01); *E02D 2450/00* (2013.01); *E02D 2600/20* (2013.01)

(58) Field of Classification Search
CPC ............ E02D 5/526; E02D 2300/0001; E02D 2300/0006; E02D 2300/0007; E02D 2300/0009; E02D 2300/001; E02D 2300/0014; E02D 2300/0017; E02D 2450/00; E02D 2600/20
See application file for complete search history.

(56) References Cited

U.S. PATENT DOCUMENTS

| | | | |
|---|---|---|---|
| 9,366,237 | B2 | 6/2016 | Oestergaard |
| 10,760,371 | B2 * | 9/2020 | Krueger ............ E21B 33/1208 |
| 2004/0169376 | A1 | 9/2004 | Ruer et al. |
| 2006/0185279 | A1 | 8/2006 | Eusterbarkey |
| 2007/0267824 | A1 | 11/2007 | Baugh et al. |
| 2008/0150292 | A1 | 6/2008 | Fedor et al. |
| 2013/0224020 | A1 | 8/2013 | Dagher et al. |
| 2015/0233359 | A1 | 8/2015 | Holt |
| 2016/0002874 | A1 | 1/2016 | Schultes |
| 2016/0305405 | A1 | 10/2016 | Kraft |
| 2020/0040541 | A1 | 2/2020 | Van Der Tempel |

FOREIGN PATENT DOCUMENTS

| | | | |
|---|---|---|---|
| CN | 101798882 | A | 8/2010 |
| CN | 102852156 | A | 1/2013 |
| CN | 202672171 | U | 1/2013 |
| CN | 202893400 | U | 4/2013 |
| CN | 103147458 | A | 6/2013 |
| CN | 203296059 | U | 11/2013 |
| CN | 203403663 | U | 1/2014 |
| CN | 203736928 | U | 7/2014 |
| CN | 204530751 | U | 8/2015 |
| CN | 205031947 | U | 2/2016 |
| CN | 205659459 | U | 10/2016 |
| CN | 205683675 | U | 11/2016 |
| CN | 206128105 | U | 4/2017 |
| DE | 202012005538 | U1 | 9/2013 |
| DE | 102013012712 | A1 | 2/2015 |
| DE | 102013019288 | A1 | 5/2015 |
| EP | 2518306 | A1 | 10/2012 |
| EP | 2594696 | A1 | 5/2013 |
| EP | 2604757 | A2 | 6/2013 |
| EP | 2672016 | A1 | 12/2013 |
| EP | 2698476 | B1 | 8/2015 |
| EP | 3064309 | A1 | 9/2016 |
| FR | 2248389 | A1 | 5/1975 |
| GB | 1121280 | A * | 7/1966 |
| GB | 2433540 | A | 6/2007 |
| GB | 2475305 | A | 5/2011 |
| GB | 2505192 | A | 2/2014 |
| JP | S5056809 | A | 5/1975 |
| JP | S5056809 | U | 5/1975 |
| JP | S58149495 | A | 9/1983 |
| JP | S58149495 | U | 10/1983 |
| JP | H0665917 | B2 | 8/1994 |
| JP | 2002129778 | A | 5/2002 |
| JP | 2003534473 | A | 11/2003 |
| JP | 2005344421 | A | 12/2005 |
| JP | 2008266896 | A | 11/2008 |
| JP | 2009092069 | A | 4/2009 |
| JP | 2011032986 | A | 2/2011 |
| JP | 2013253536 | A | 12/2013 |
| JP | 2015055046 | A | 3/2015 |
| JP | 2015513046 | A | 4/2015 |
| JP | 2016109138 | A | 6/2016 |
| JP | 2017002487 | A | 1/2017 |
| NL | 2017594 | B1 | 4/2018 |
| RU | 2007104928 | A | 8/2008 |
| WO | 0190504 | A1 | 11/2001 |
| WO | 2005005752 | A1 | 1/2005 |
| WO | 2006005323 | A1 | 1/2006 |
| WO | 2009026933 | A1 | 3/2009 |
| WO | 2013057459 | A1 | 4/2013 |
| WO | 2013155521 | A1 | 10/2013 |
| WO | 2015082631 | A1 | 6/2015 |
| WO | 2017178657 | A1 | 10/2017 |
| WO | 2018070868 | A1 | 4/2018 |

OTHER PUBLICATIONS

Canadian Office Action for Application No. 3,109,993, PCT No. PCT/EP2018/077946, Dated: Nov. 21, 2023, 4 pgs.
Russian Search Report for Russian Application No. 2020114886 filed Oct. 12, 2018; Dated: Dec. 1, 2021; 2 pgs.

* cited by examiner

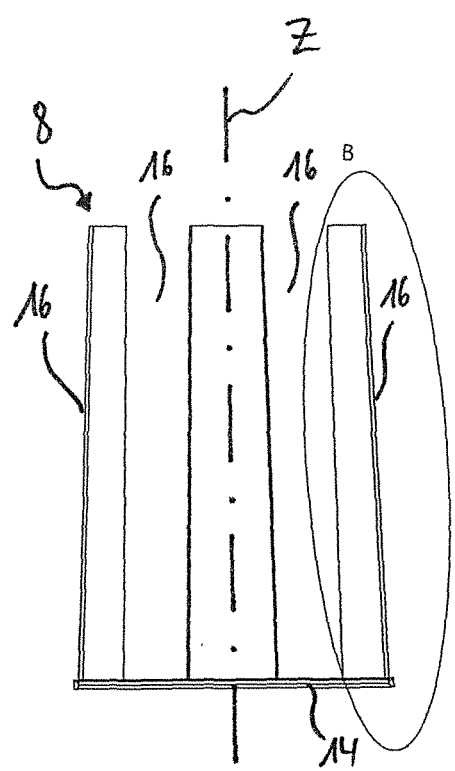
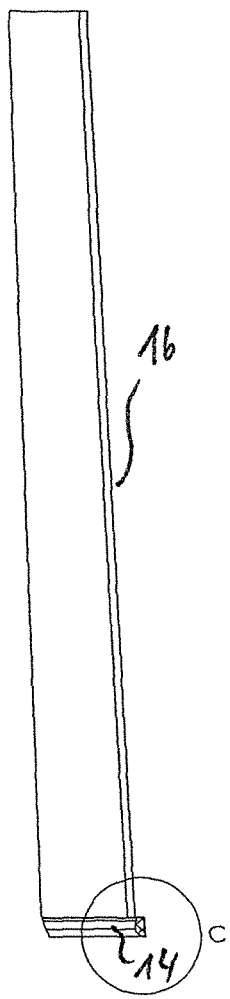
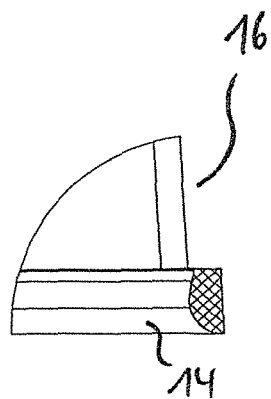
Fig. 5
DETAIL B
DETAIL C

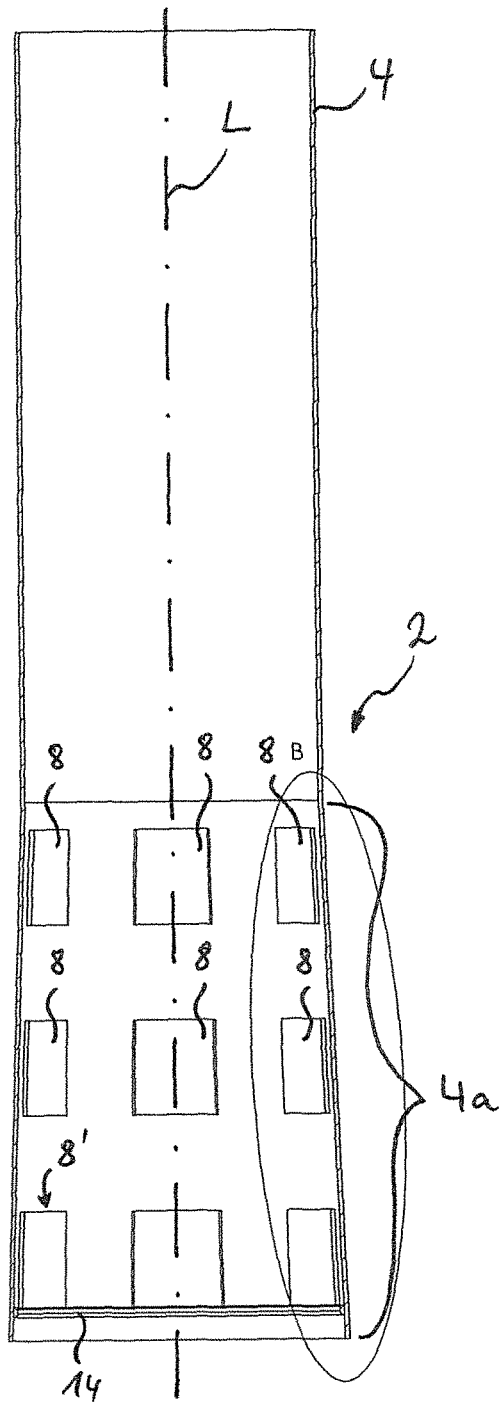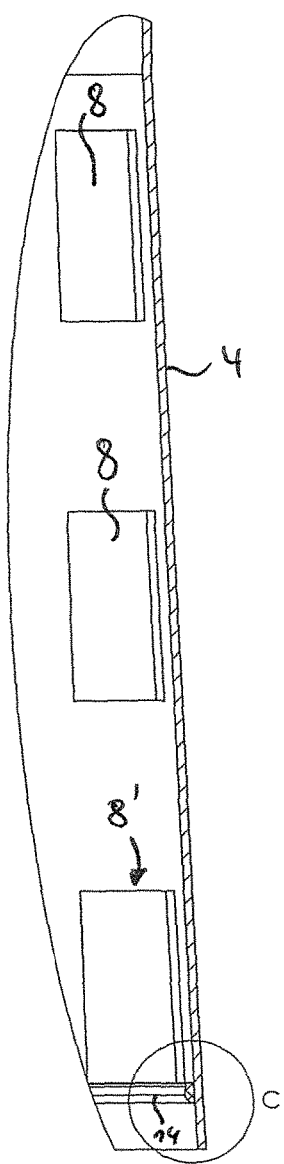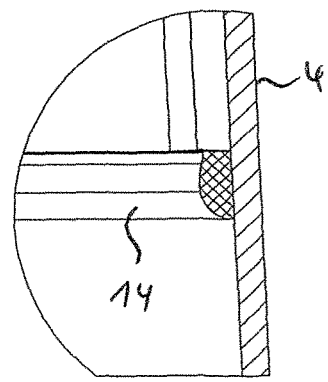
Fig. 6
DETAIL B
DETAIL C

SEALING ARRANGEMENT FOR A CONNECTION BETWEEN TWO CONNECTING ELEMENTS OF AN OFFSHORE STRUCTURE AND METHOD FOR PRODUCING SAME

BACKGROUND

The present invention relates to a seal arrangement for a joint of two joint elements, in particular realized as a monopile and a transition piece, of an offshore structure, preferably an offshore wind energy installation, in particular a substructure thereof. Furthermore, the invention relates to a method for producing the same.

In the construction of offshore wind energy installations, a large number of different types of foundation are used, which support the actual wind energy installation at the offshore location. Typical foundation types are jackets, tripods, tetrapods, monopiles, gravity-based foundations, tripiles, bucket foundations, or also floating foundations, the possible application of which depend on factors such as the weight of the wind energy installation, the water depth, and the conditions and composition of the seabed.

In the case of a monopile substructure, a foundation tube (monopile) driven into the seabed is connected to a transition piece. The wind energy installation can then be erected on the transition piece. To make the joint, the standard practice is to fit the transition piece over the monopile, and to fill, or grout, an annular gap present between the two joint elements with a grouting mortar. Alternatively or additionally, the two joint elements may be riveted or screwed together, in particular by use of appropriate flanges.

During operation, the installation is sometimes exposed to heavy loads, for example due to wind and waves. This causes the monopile and the transition piece supporting the wind energy installation to move relative to each other. Over time, conventional grouting mortar tends to break under such loads, which weakens the joint between the monopile and the transition piece, and results in the transition piece supporting the wind energy installation being permanently shifted out of the optimal position, in particular in subsiding or tilting of the installation. Tilting of the transition piece relative to the monopile can then cause gaps to occur between the two joint elements, such that the encapsulation of this assembly is no longer assured. Consequently, seawater can enter the assembly and cause damage.

EP 2 672 016 A1 discloses a sealing lip for a standard grouted joint of a pile, driven into the seabed, and a socket, which is intended to prevent ingress of water into the assembly, and the associated removal of mortar. However, it cannot counteract fractures caused by the loads occurring during operation, such that subsiding or tilting of the wind energy installation is not prevented.

SUMMARY

The invention is therefore based on the object of improving a joint of two joint elements, in particular realized as a monopile and a transition piece, of an offshore structure, preferably an offshore wind energy installation, in particular a substructure thereof. In addition, the object of the invention is to provide a cost-effective and process-safe method for the production of the components necessary to improve the joint. Furthermore, the object of the present invention is to provide a cost-effective and process-safe method for constructing at least one part of an offshore wind energy installation.

This object is achieved by a seal arrangement having the features of claim 1, and by a method for producing a seal arrangement. The object is also achieved by a method for constructing a substructure of an offshore wind energy installation. Advantageous further developments of the invention are given by the dependent claims relating thereto, and by the following description.

According to the invention, at least one seal unit is fixed to at least one of the joint elements in such a manner that the seal unit, in a joining position, is arranged between an inner joint surface of one joint element and an outer joint surface of the other joint element. In the joining position, for the purpose of producing a stable joint an upper joint element, in particular realized as a transition piece, and a lower joint element, in particular realized as a monopile, are inserted into each other clamping the at least one seal unit.

The joint elements in this case, which are usually at least partially cylindrical, each have at least one tapered portion, in particular in the form of a hollow truncated cone, in which the respective joint surface is at least partially located. The geometry of the hollow truncated cone in this case is defined by the opening angle of the cone, which is preferably 2° to 6°, preferably 3° to 5°, particularly preferably 4°.

In the joining position, the joint elements are preferably arranged coaxially in relation to each other, overlapping each other at least in the respective tapered portions. The conicity makes it possible for (weight) forces to be transmitted in the axial direction. One "outer" joint element in this surrounds the other "inner" joint element, with an inner joint surface of the outer joint element and an outer joint surface of the inner joint element facing each other.

The at least one seal unit is fixed to at least one of the joint elements, for example by bonding or adhesion. If a plurality of seal units are used, one seal unit may be fixed to one joint element, while another seal unit is fixed to the other joint element.

In particular when using a multipart seal unit the parts of which preferably do not weigh more than 50 kg, these individual parts can be cast separately, transported to the joint element and there individually stuck on and assembled to form the seal unit. The individual parts of the seal unit can be securely attached to one another by means of tongue-and-groove or other joining systems and/or optionally attached to one of the joint elements in addition to or as an alternative to an adhesively bonded joint. These tongue-and-groove or other joining systems can, depending on requirements, with regard to the forces to be reacted by their connection force reacting parts, preferably be made of polyurethane or alternatively of a number of materials, including in particular cast-in steel parts. In order to form a joining system, the individual parts of the seal unit can also be designed to be magnetically securable to one another. To that end, preferably permanent magnets are cast into the seal unit parts. These can attract counterparts present in adjoining seal unit parts, these counterparts being magnetic or magnetizable. It is also possible for one or more magnets, arranged in the parts, to permit an advantageous first positioning on the joint element typically made of steel, even in the case of adhesively bonded joints.

The at least one seal unit is arranged between the joint elements and is clamped there, in particular owing to the weight force of the upper joint element, and it transmits forces, for example the weight force of the upper joint element, to the lower joint element. In addition, the at least one seal unit is load-bearing, such that it distances the joint elements from each other and supports the upper joint element. There is a frictional joint between the seal unit and the joint surface of the joint element to which the seal unit is not fixed, thereby creating a stable joint between the joint elements.

The joint of two joint elements is thus improved without the use of grouting mortar and/or rivets or screws. Such a seal arrangement absorbs the loads caused by a relative movement between the two joint elements, without being subject to fatigue fractures, but instead has a damping effect, and thus renders possible a stable and durable joint that is easily produced and assembled.

As a result of the joint elements being connected on the basis of the seal arrangement, it is possible to compensate weld seams, offsets between parts of the joint elements welded together or deviations of the joint elements from the desired shape, for example ovality. Furthermore, the rapid and easy assembly makes it possible to dispense with manual activities in the region of the joint. Connecting by inserting the joint elements into each other can thus be also effected under water for the purpose of assembling the structure, without the usually resource-intensive use of diving personnel.

At least one seal unit has at least one elastic sealing element, which extends in the circumferential direction around the entire circumference. The sealing element in this case is designed to extend over the entire circumference of the annular gap that is present between the joint elements. The thickness of the sealing element is greater than the thickness of an adjoining seal unit region, such that the sealing element protrudes relative to the rest of the seal unit. In this case, the thickness is defined as the external dimensions perpendicular to the adjoining joint surface. In other words, the sealing element protrudes with respect to the rest of the seal unit.

Furthermore, the sealing element is of an elastic design, such that, if the joint elements move relative to each other, it exerts a sufficient compressive force upon an opposite joint surface, and the assembly remains encapsulated. Harmful seawater or moisture therefore cannot enter, thereby rendering such a joint even more durable.

The sealing element is preferably arranged in the vicinity of one end face of the outer joint element. For example, the sealing element for a seal arrangement for a monopile substructure is arranged at the lowermost end of the seal arrangement, such that almost the entire seal arrangement is encapsulated.

The sealing element is realized, in particular, in the form of a full-circumference sealing lip. However, other seal variants are also conceivable. For example, the sealing element may also be realized in the form of a labyrinth seal, the individual shaped elements of which do not themselves extend around the entire circumference, but with which full-circumference sealing of the joint is nevertheless achieved.

Preferably, the at least one seal unit has a thickness of from 5 mm to 75 mm, preferably 20 mm to 50 mm, particularly preferably 25 mm to 30 mm. These thicknesses enable the seal unit to absorb loads particularly well, and accommodate the joint element sizes, to be anticipated in the future, having diameters of up to 8 m. In this case, the sealing element usually has a thickness that is 50% to 100% greater than the thickness of the adjoining seal unit.

In a preferred development of the invention, the at least one seal unit is of multilayer construction. In particular, layers having differing properties or of differing materials may be provided. Thus, for example, depending on the location of use, it is possible to achieve suitable layer geometries having optimal properties that improve the load absorption.

Particularly preferably, the one or more sealing elements/ have a greater elasticity than the rest of the seal unit. In particular, the sealing has element may be arranged as a layer comprising an elastic material against a less elastic or low-elasticity layer, and thus the sealing property can be provided with reduced thickness of the seal unit in this region, thereby saving material and reducing the production costs.

In a further development of the invention, the at least one seal unit is designed to be hydrolysis-stable. This guarantees a permanent stability of the seal arrangement during operation at the offshore location.

Preferably, the at least one seal unit in this case comprises one or more plastics, as these are corrosion-resistant and inexpensive to produce. In this context, elastomers, thermoplastics, in particular with the addition of plasticizers, and/or thermosets may be used. Particularly preferably, the at least one seal unit comprises one or more materials from the group polypropylene, polyethylene, polyoxymethylene, rubber, nylon, polyvinyl chloride, polyurea, polyurethane, with foams composed of the above materials also being included.

Particularly preferably, the at least one seal unit comprises hydrolysis-stable polyurethane, in particular a polyurethane based on a polyether polyol and a methylene diphenyl isocyanate (MDI). Polyurethane is resistant to salt water, easy to produce and extremely resistant to abrasion, and is therefore particularly suitable for offshore operation.

In a particularly preferred development of the invention, a first layer is made of a polyurethane, in particular polyurethane foam, and this first layer, possibly bonded to the joint element via a primer, is at least partially covered by a further layer made of a non-foamed polyurethane. The sealing unit may then likewise be made of a polyurethane foam, and be formed on or adjacent to at least one of the two layers.

In a further development of the invention, the at least one seal unit comprises up to 50% of one or more fillers, preferably in the form of $CaCO_3$ (up to preferably 33%), wollastonite (as powder, e.g. TREMIN 283-800 AST having a $D_{98}$ of from 12 μm, up to preferably 25%), graphite and/or carbon black (each up to preferably 15%). The addition of these particularly inexpensive fillers makes the seal arrangement more cost-effective to produce.

According to a particularly preferred development of the invention, it is provided that the at least one seal unit adheres to the joint surface of at least one of the joint elements by means of an adhesion promoter. This results in a particularly strong material bond between the seal unit and the joint element, with high adhesive strength, which increases the durability of the seal arrangement.

Advantageously, the at least one seal unit, except for the sealing element, has a Shore A hardness of between 70 and 100, or a Shore D hardness of 20 to 80. A seal unit that has these degrees of hardness can durably support the upper joint element.

Particularly preferably, the at least one sealing element has a Shore A hardness of between 40 and 100, preferably between 40 and 90, particularly preferably between 40 and less than 70. At these degrees of hardness, the sealing element is sufficiently elastic, such that a good sealing, or encapsulation, of the assembly is achieved.

According to a further preferred development of the invention, it is provided that the at least one seal unit is designed to withstand a compressive load of from 0.1

N/mm$^2$ to 50 N/mm$^2$. Such a design has the effect that the seal unit remains durably usable under loads during the operation of an offshore wind energy installation.

The at least one seal unit may be realized in the form of a ring, a hollow cylinder, a hollow truncated cone or combinations thereof. Furthermore, the at least one seal unit may realize a segment of a ring, hollow cylinder or hollow truncated cone.

A ring, a hollow cylinder and a hollow truncated cone are shaped bodies in which a singular central axis is defined by their rotational symmetry, the central axis being enclosed by the respective shaped body. The height of the seal unit is defined by the external dimensions parallel to its central axis. The inner diameter of the seal unit is defined by the inner dimensions of the seal unit in a sectional plane perpendicular to the central axis. The outer diameter of the seal unit is defined by the external dimensions of the seal unit in a sectional plane perpendicular to the central axis. The central axis, the inner and the outer diameter of a seal unit realized as a segment of a shaped body are defined by the shaped body of which they realize a segment.

In particular, the at least one seal unit has a height of at least 1 m and a diameter of at least 2.5 m. The seal unit thus has a sufficient load capacity and, in particular, is easy to manipulate. Particularly preferably, a total height of a group of seal units formed by a plurality of seal units, in particular distanced from each other parallel to their height, is up to 30 m. Such a group of seal units of this total height may be realized, in particular, by a plurality of preferably annular seal units, which are preferably distanced from each other and/or provided with recesses. This allows subsequent welding work to be performed on the joint element in the seal-free regions, for example for the purpose of attaching conductors or the like.

Preferably, the seal unit is realized in such a manner that it bears positively, at least partially, in particular entirely, against the joint surface of the joint element to which it is fixed. In particular, the seal unit is furthermore realized in such a manner that, in a joining position, it bears positively, at least partially, preferably entirely, against the joint surface of the joint element to which it is not fixed. The positive fit serves to distribute the loads over as large an area as possible, and in particular to avoid concentrated loads, thereby enabling a stable joint to be achieved and rendering the seal unit more durable. Particularly preferably, the at least one seal unit is adapted to the geometry of at least one joint element, in such a manner that it is realized, at least partially, preferably entirely, in the form of a hollow truncated cone, the cone opening angle of which is preferably 2° to 6°, preferably 3° to 5°, particularly preferably 4°.

In a preferred development of the invention, the at least one seal unit is composed of a plurality of seal segments arranged next to each other. The seal segments in this case may be separated in any manner, a "separation line" extending, in particular, in the circumferential direction and/or along the height of the seal unit. Preferably, the seal segments in this case are realized at least in the region of the at least one sealing element, for the purpose of positive and/or non-positive, tight joining.

In a particularly preferred development of the invention, the seal arrangement comprises at least two seal units that are distanced from each other. The seal units may be distanced in a direction parallel to the longitudinal central axis of the joint element to which they are fixed. Thus, on the one hand, a spatial extension of the seal unit necessary for the stability of the joint can be provided on the joint surface and, in addition, material can be saved, thus enabling the seal arrangement to be produced more cost-effectively and installed with a lesser resource requirement.

In addition, the seal units may be distanced from each other circumferentially with respect to the longitudinal central axis of the joint element to which they are fixed. In regions away from the sealing element, in which encapsulation of the assembly is no longer necessary, material can thus be saved, making the sealing assembly more cost effective to produce and install.

In another preferred development of the invention, the at least one seal unit has at least one recess in the circumferential direction, in at least one height portion. Material can thus be saved even in the case of a continuous seal unit, which stabilizes the joint particularly well. Moreover, welding work can be performed subsequently on the joint element in seal-free regions, for example for the purpose of attaching conductors or the like. In particular, a seal unit realized as a hollow cylinder and/or high truncated cone is circumferentially closed in an upper and a lower height region, and has at least one recess, in the circumferential direction, between the upper and lower height region. Particularly preferably, a seal unit realized as a hollow cylinder and/or hollow truncated cone, which is realized so as to extend circumferentially in a lower region, in particular in the vicinity of the sealing element, has at least one recess in the circumferential direction in the rest of the region.

The seal arrangement advantageously comprises a sensor arrangement for sensing the mechanical forces occurring in the seal arrangement. This allows the loads prevailing during operation to be recorded and the functionality of the seal arrangement to be monitored, such that, in the event of a failure, countermeasures can be initiated promptly before major damage occurs. In addition, the sensor enables the condition of other parts of the wind energy installation to be monitored, for example by sensing characteristic vibrations/strains, thereby enabling damage prevention to be initiated.

In another embodiment according to the invention, a possibly further sensor arrangement is provided which is arranged in at least one part of the preferably multipart seal unit and monitors a positioning of at least one of the joint elements. This is preferably a sensor arrangement which outputs an appropriate signal, in particular to a monitoring unit, when a specific pressure, characteristic of an arrangement of one joint element in another, is reached. Equally, a sensor arrangement of this kind can serve for long-term monitoring of the correct fit of one joint element in another. In the event, for example, of the joint elements tilting with respect to another, the sensor arrangement can output an appropriate signal which is transmitted to a/the monitoring unit by means of associated communication means or can be output when required/requested.

The least one seal unit is advantageously self-supporting, which improves ease of manipulation and prevents damage due to improper mounting.

Particularly preferably, at least one seal unit in one end region realizes a cover surface, extending in a radial direction and thus transversely in relation to the central axis of the seal unit, which is designed in particular for the transmission of weight forces, such that the joint is stabilized.

A particular advantage of the seal arrangement according to the invention is that the amount of work required to make the joint at the offshore location is minimized, since, for example, in the case of a monopile substructure, the seal unit can already be fixed to the transition piece on land. At the offshore location, where the working conditions are less favourable than on land, it only remains for the transition piece and the monopile together to be plugged together.

The seal arrangement according to the invention has been described above as an example on the basis of the joint of a monopile and a transition piece. However, the possible applications are not limited to this. Rather, the seal arrangement according to the invention may be used to improve further joints of offshore structures, especially in the field of offshore wind energy installations. These include the joints of a transition piece and one or more pile structures of the following foundation types: jackets, tripods, tetrapods, gravity-based foundations, triples, bucket foundations or floating foundations. Moreover, the seal arrangement according to the invention may also be used for joints in the field of offshore high-voltage direct-current transmission systems.

In addition, the seal arrangement according to the invention may also be used in the erection of the actual wind energy installation, to provide an improved joint between individual tubular tower sections.

According to that which has already been described above and that which is described below, the object stated at the outset is also achieved by a method for producing a seal arrangement for a joint of two joint elements, in particular realized as a monopile and a transition piece, of an offshore structure, preferably an offshore wind energy installation, in particular a substructure thereof, in which a grouting compound is poured onto a joint surface of a joint element and hardens to form at least one seal unit.

By use of this approach, an optimal positive fit of the seal unit with the joint element is achieved, thus avoiding concentrated loads in a joining position, thereby increasing the service life of the seal assembly. In this context, "pouring" means, in particular, that the grouting compound flows, or runs out of an opening, at least substantially by means of gravity, onto the joint surface.

In particular, such a pouring process can produce a seal arrangement in a short time. The grouting compound in this case is preferably applied, or poured, at a rate of from 15 kg/min to 30 kg/min, preferably 18 kg/min to 22 kg/min, enabling a seal arrangement to be produced more rapidly than by means of a spraying process.

According to a further development of the invention, it is provided that the grouting compound is poured in the region of the joint surface of a joint element, and hardens to form at least one sealing element. The region of the joint surface comprises the joint surface itself and/or one or more layers of the grouting compound, already applied to the joint surface, that are present in a hardened or non-hardened state and onto which the grouting compound, hardening to form the sealing element, is applied. In addition to an optimal positive fit, optimal sealing is achieved between the sealing element and the region of the joint surface, thereby enabling the encapsulation to be facilitated by the sealing element in a joining position.

In a further, particularly preferred development of the invention, it is provided that the material properties of the grouting compound, comprising one or more starting materials, are modified during production of the at least one seal unit by the addition of at least one further starting material and/or by variation of the quantity ratio of the starting materials. Desired layer geometries having optimized properties can thereby be produced in an efficient manner, depending on the location of use and thus, for example, the load-bearing capacity of the seal arrangement can be improved.

In particular, the material properties of the grouting compound are modified "on line", i.e. during the grouting process, thus reducing the process duration. In addition, the fractions of the grouting compound that have differing material properties can be materially bonded together in an optimal manner, thereby making the seal arrangement more robust and enabling a better joint to be made.

In a further development of the invention, the grouting compound is poured by use of a grouting device having at least one shaping grouting opening. The grouting opening is, in particular, in the form of a slot. This allows the grouting compound to be applied more precisely and thus the desired geometry of the seal arrangement can be achieved exactly. In particular, "pouring" in this sense means that the grouting compound runs out of the grouting opening substantially by means of gravity.

Particularly preferably, the grouting compound is applied to the joint surface in at least two spatially separated fractions. In particular, the grouting device has a plurality of grouting openings that apply the grouting compound simultaneously in spatially separated fractions. This reduces the time required to perform the process, and makes the process more efficient, which reduces the costs for a seal arrangement.

In a further, particularly preferred development of the invention, it is provided that the grouting compound comprises at least two starting materials, which are mixed together in an antechamber of the grouting device prior to pouring. A particularly high degree of homogeneity of the grouting compound is thus achieved, and the desired material properties can be optimally adjusted.

In particular, the at least two starting materials in this case react with each other in the antechamber of the grouting device. A reaction occurs, for example, when polyurethane is used as a grouting compound, whereby polyol and isocyanate are mixed with each other in the liquid phase, if necessary with a crosslinker, and after a certain time harden to form polyurethane. The rate of hardening may be influenced by addition of a catalyst and/or inhibitor. Preferably, the aforementioned components are mixed in an antechamber of the grouting device, in a ratio that is optimal for application, and then applied as a grouting compound, which makes the process particularly reliable.

According to another preferred embodiment of the invention, it is provided that the grouting compound comprises at least one thermoplastic starting material, which is heated in an antechamber of the grouting device to achieve a pourable state. The temperature of the grouting compound, comprising at least one thermoplastic starting material, can thus be controlled directly before application and, in particular, can be adapted for optimal application.

In a further, particularly preferred embodiment of the invention, it is provided that the joint element is mounted so as to be rotatable about its longitudinal central axis, and the grouting compound is poured onto a joint surface of the rotating joint element. In particular, the longitudinal central axis is angled relative to a horizontal. This is the case when the grouting compound is poured onto the joint surface in a tapered portion of the joint element. In this case, the angle between the longitudinal central axis and the horizontal corresponds to approximately half the cone opening angle of the tapered portion of the joint element, such that the region of the tapered portion of the joint element lying vertically below the longitudinal central axis is aligned flat in one direction for application of the grouting compound.

Preferably, the application of the grouting compound to the joint surface of the rotating joint element is continued at least until the grouting compound has been applied at least once around the entire circumference of the joint surface. This allows the grouting compound to be applied to a large portion of the joint surface in a short time. In the case of layer thicknesses of 3 cm, application of the grouting compound can be completed by a maximum of two revolutions of the joint element with respect to a corresponding grouting opening, thereby enabling a seal arrangement to be produced, in particular, more rapidly than by means of a spraying process.

In a further embodiment of the invention, the rotation of the joint element is continued after application of the grouting compound until the grouting compound has sufficiently hardened. The grouting compound is sufficiently hardened when it no longer flows. The grouting compound can thus be applied in a particularly even and symmetrical manner, resulting in a desired uniform loading in the finished seal arrangement.

In a further preferred embodiment of the invention, it is provided that, during the grouting operation, the grouting opening and/or the rotating joint element are moved relative to each other, along a direction perpendicular to the circumferential direction, such that the grouting compound is applied to a larger surface area of the joint element. In particular, in this case the distance of the grouting opening from the joint surface is constant during the application of a layer. The grouting opening in this case executes a spiral movement relative to the joint surface, which results in a particularly uniform, large-area and rapid application of the grouting compound.

Alternatively, it is provided that the joint element is mounted so as to be rotatable about a longitudinal central axis of the joint element, which is in particular angled relative to a horizontal, grouting compound is applied to a joint surface of the joint element, the joint element is rotated at least once to a position that corresponds to a rotation by one third of a revolution or by less than one third of a revolution, and grouting compound is applied again to the joint surface of the joint element.

In this context, it is also possible to provide an in particular additional movement of the grouting device, during the application of the grouting compound, in the circumferential direction of the joint element. The radius of movement in this case should be limited to a lower region of the joint element with respect to gravity, to enable the pouring process to be performed. Moreover, it may be provided that the grouting opening executes a zigzag or serpentine movement relative to the joint surface, which also results in a particularly uniform, large-area and rapid application of the grouting compound.

In a further development of the invention, it is provided that the grouting compound is applied in a layer thickness of from 5 mm to 75 mm, preferably 20 mm to 50 mm, particularly preferably 25 mm to 30 mm. In case of multi-layer application, individual layers having lesser layer thicknesses may be applied. With such layer thicknesses, the applied material cannot shift or deliquesce adversely, such that the process is more reliable.

In another advantageous development of the invention, a sensor arrangement for sensing mechanical forces is installed, in particular embedded in the grouting compound. This allows the loads prevailing during operation to be recorded and the functionality of the seal arrangement to be monitored.

In a further development of the invention, it is provided that the joint surface of the joint element is preconditioned by means of an adhesion promoter (primer) prior to the application of the sealing compound. The preconditioning in this case comprises the application of the primer, in particular by the grouting device, and drying the primer and/or leaving the primer to dry. This results in increased adhesive strength between the grouting compound and the joint element, such that the grouting compound cannot shift, or deliquesce, in a disadvantageous manner.

The application of the grouting compound, and in particular the preconditioning by means of an adhesion promoter, is preceded by a pretreatment of the joint surface of the joint element. This pretreatment preferably comprises one or more of the following steps:
- cleaning, in particular degreasing, of the joint surface,
- sandblasting of the joint surface, and
- subsequent cleaning of the joint surface, in particular removal of dust.

This removes deposits such as dirt or rust and smoothes out uneven areas, thus enabling a particularly even application and adhesion of the grouting compound.

Furthermore, the object stated at the outset is achieved by a method for producing a joint of two joint elements of an offshore structure, in particular an offshore wind energy installation, preferably a substructure thereof, comprising two joint elements realized as a monopile and a transition piece, which comprises the following steps:
- A providing a joint element having a joint surface,
- B producing a seal arrangement on the joint surface of the joint element,
- C inserting one joint element and the other joint element into each other in a clamping manner.

BRIEF DESCRIPTION OF THE DRAWINGS

Further advantages and details are given by the following description of the figures.

There are shown in the schematically represented figures.

DETAILED DESCRIPTION

Parts that have the same or similar function are denoted—where appropriate—by identical reference numbers. Individual technical features of the exemplary embodiments described below may also result, with the features of the exemplary embodiments described above and the features of an independent claim, in further developments according to the invention.

Figure 1:
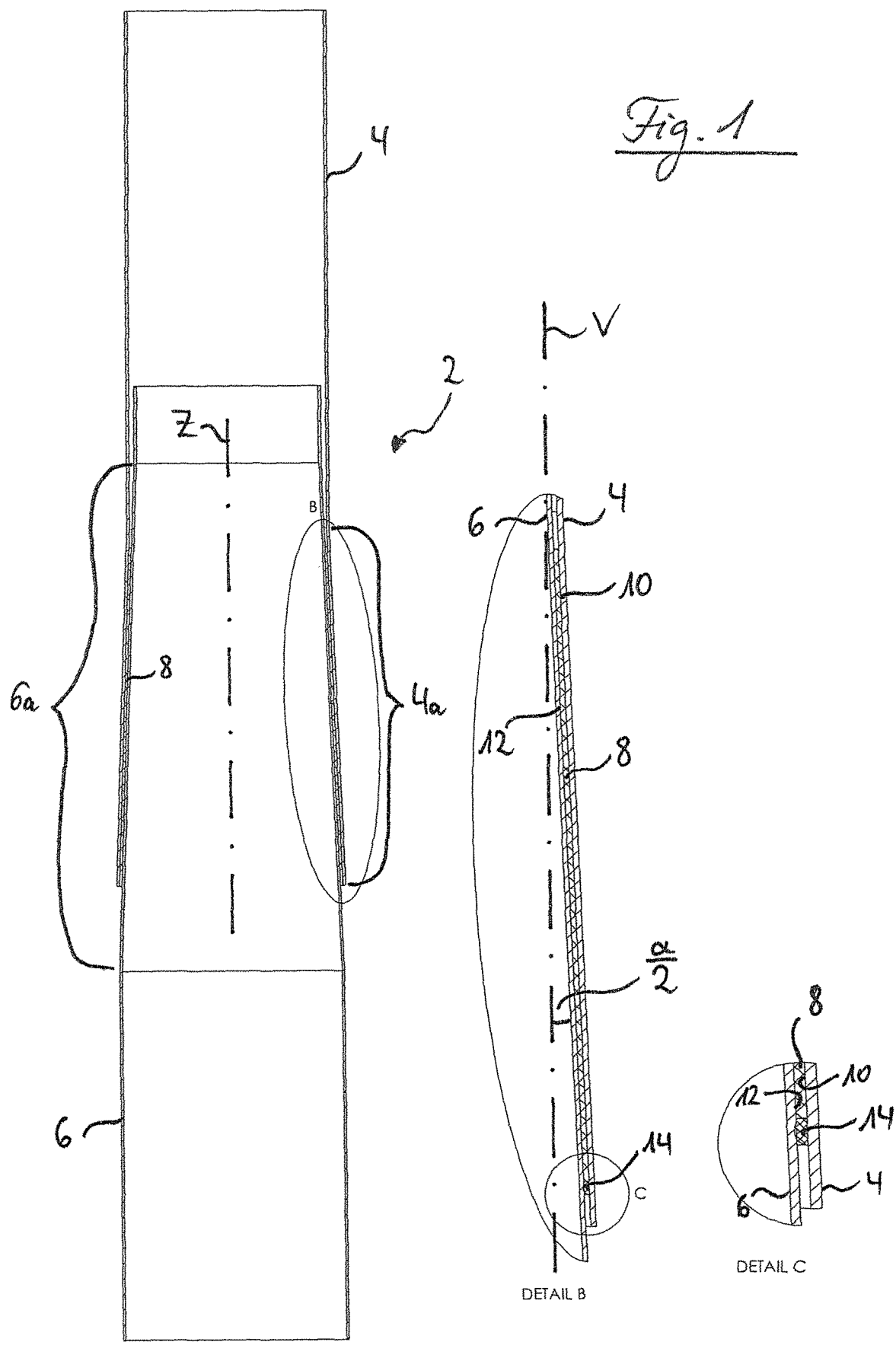
FIG. 1 a sectional representation of a subject according to the invention in a joining position, with two enlarged detail views, FIG. 2 a sectional representation of a further subject according to the invention, with two enlarged detail views, FIG. 3 a sectional representation of the seal unit from FIG. 2, with two enlarged detail views, FIG. 4 a sectional representation of a further subject according to the invention, with two enlarged detail views, FIG. 5 a sectional representation of the seal unit from FIG. 4, with two enlarged detail views, FIG. 6 a sectional representation of a further subject according to the invention, with two enlarged detail views, FIG. 7 a sectional representation of the seal units from FIG. 6, with two enlarged detail views, FIG. 8 a further subject according to the invention, in a transparent view, FIG. 9 a non-transparent sectional representation of the subject from FIG. 8, FIG. 10 a flow diagram of the method according to the invention.

FIG. 1 shows a seal arrangement 2 according to the invention in a joining position. In this case, an upper joint element 4 and a lower joint element 6 have been inserted into each other, with the tapered portion 4a of the upper joint element 4 and the tapered portion 6*a* of the lower joint element 6 overlapping. As can be seen particularly well in the enlarged view B (detail B), the joint elements 4, 6 have been inserted into each other, with a seal unit 8 clamped-in between them.

The upper joint element 4, in a lower region, encompasses an upper region of the lower joint element 6, and thus constitutes the outer joint element, while the lower joint element 6 may be regarded as the inner joint element.

The seal unit 8 is arranged between an inner joint surface 10 of the upper joint element 4 and an outer joint surface 12 of the lower joint element 6, distances the joint elements 4, 6 from each other, and transmits forces between the joint elements 4, 6, for example transmits the weight force of the upper joint element 4 to the lower joint element 6. In this sense, the seal unit 8 supports the upper joint element 4.

The seal unit 8 is additionally realized in the form of a hollow truncated cone, which is matched to the geometry of the joint elements 4, 6. For this purpose, the tapered portions 4*a*, 6*a* of the joint elements 4, 6, and the seal unit 8, can be described by one and the same cone opening angle α, which is defined by the inclination of the cone envelope in relation to a vertical V (see enlarged view B (detail B)). In the examples shown here, the cone opening angle α is 4°. The angle of inclination of the cone envelope in relation to the vertical, which is clearly visible in the enlarged view B, corresponds to half the cone opening angle α, and is 2°. Furthermore, the rotational symmetry of the hollow conical shaped body defines a central axis Z for the seal unit 8.

Figure 3:
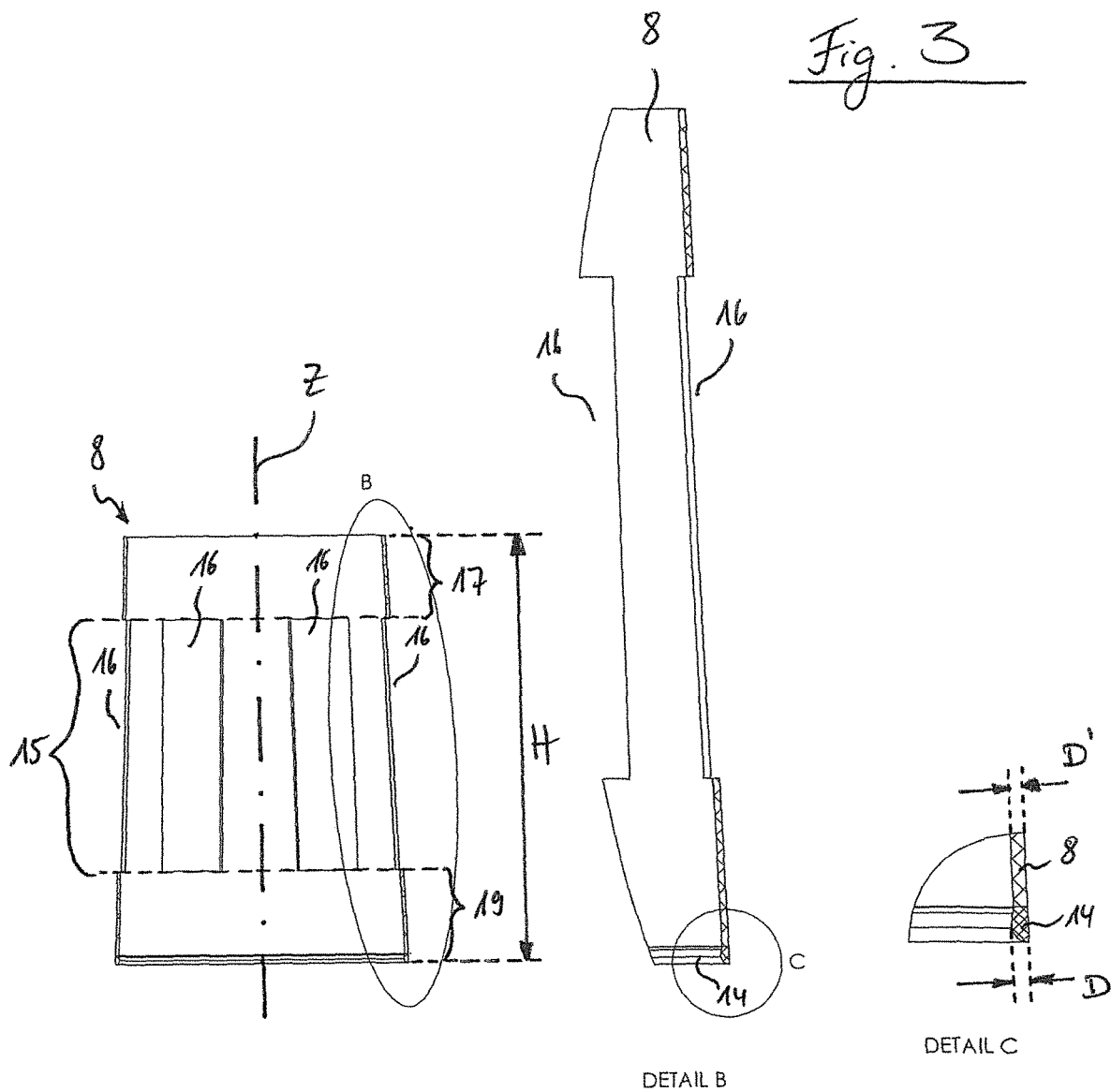

The seal unit 8 has an elastic sealing element 14, which extends in the circumferential direction around the entire circumference. The thickness D of the sealing element 14 is greater than the thickness D' of an adjoining seal unit region, as can be seen in FIG. 3, enlarged view C (detail C). The sealing element 14, which protrudes with respect to the rest of the seal unit 8, exerts a compressive force upon an opposite joint surface that, in the examples shown here, is the outer joint surface 12 of the lower joint element 6. If the joint elements 4, 6 move relative to each other, the assembly remains encapsulated, such that no harmful seawater and/or moisture can enter.

Figure 2:
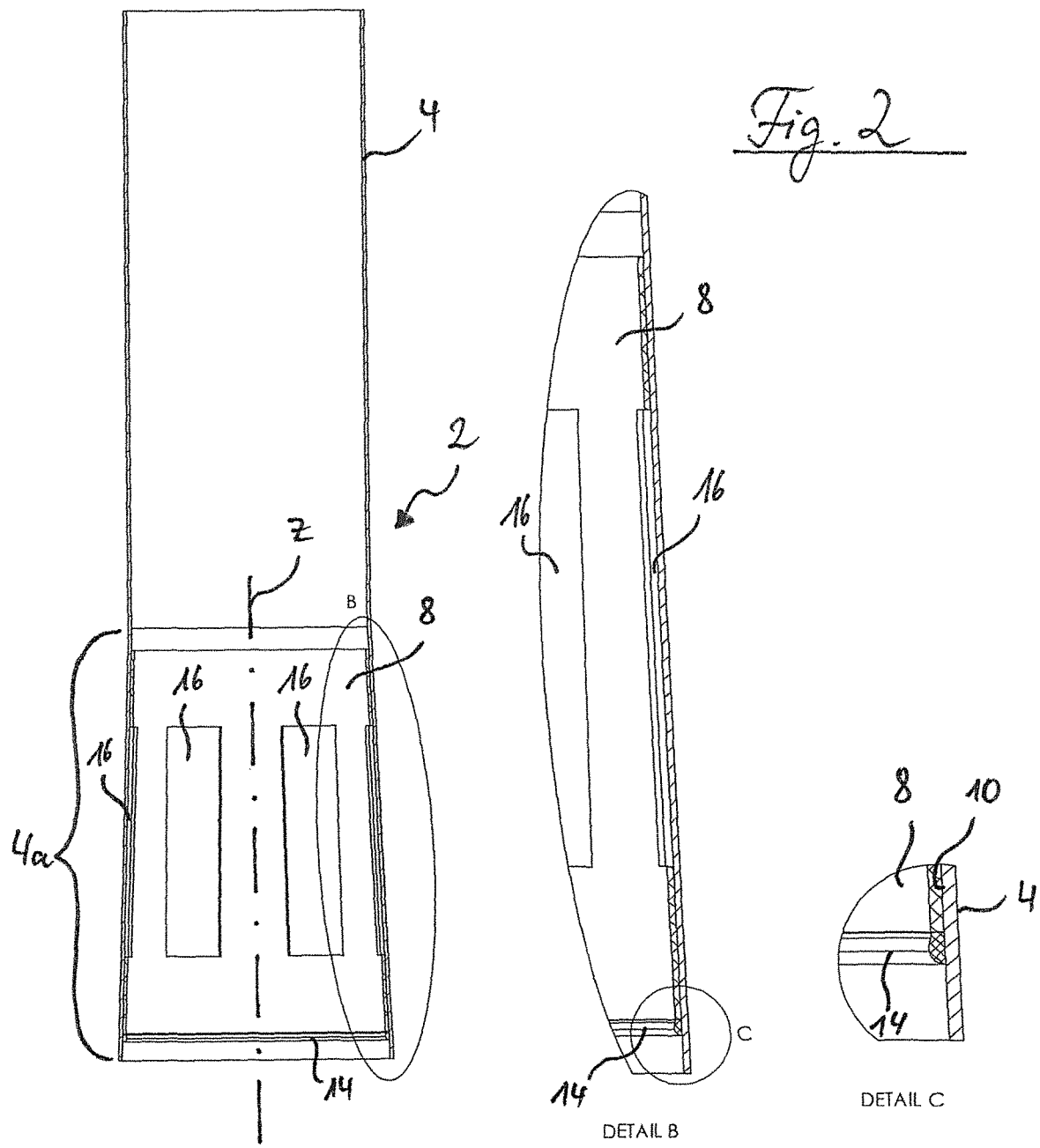

FIG. 2 shows a seal arrangement 2, the seal unit 8 of the upper joint element 4 being fixed, in the tapered portion 4*a*, to the inner joint surface 10. To make the joint, the upper joint element 4 comprising the seal unit 8 is placed over a lower joint element 6, or lowered onto the lower joint element 6, until a clamped joint is produced. It can be seen that the seal unit 8 may alternatively be fixed to the lower joint element 6, in the tapered portion 6*a*, on the outer joint surface 12, before the joint is made.

FIG. 3 shows the seal unit 8 from FIG. 2. The seal unit 8 is realized in the form of a hollow truncated cone, and in this case has a plurality of recesses 16 in the circumferential direction in a height portion 15, between an upper circumferentially closed height portion 17 and a lower circumferentially closed height portion 19, resulting in saving of material. In addition, the height H of the seal unit 8 is represented as an outer dimension of the seal unit 8 measured parallel to the central axis Z.

Figure 4:
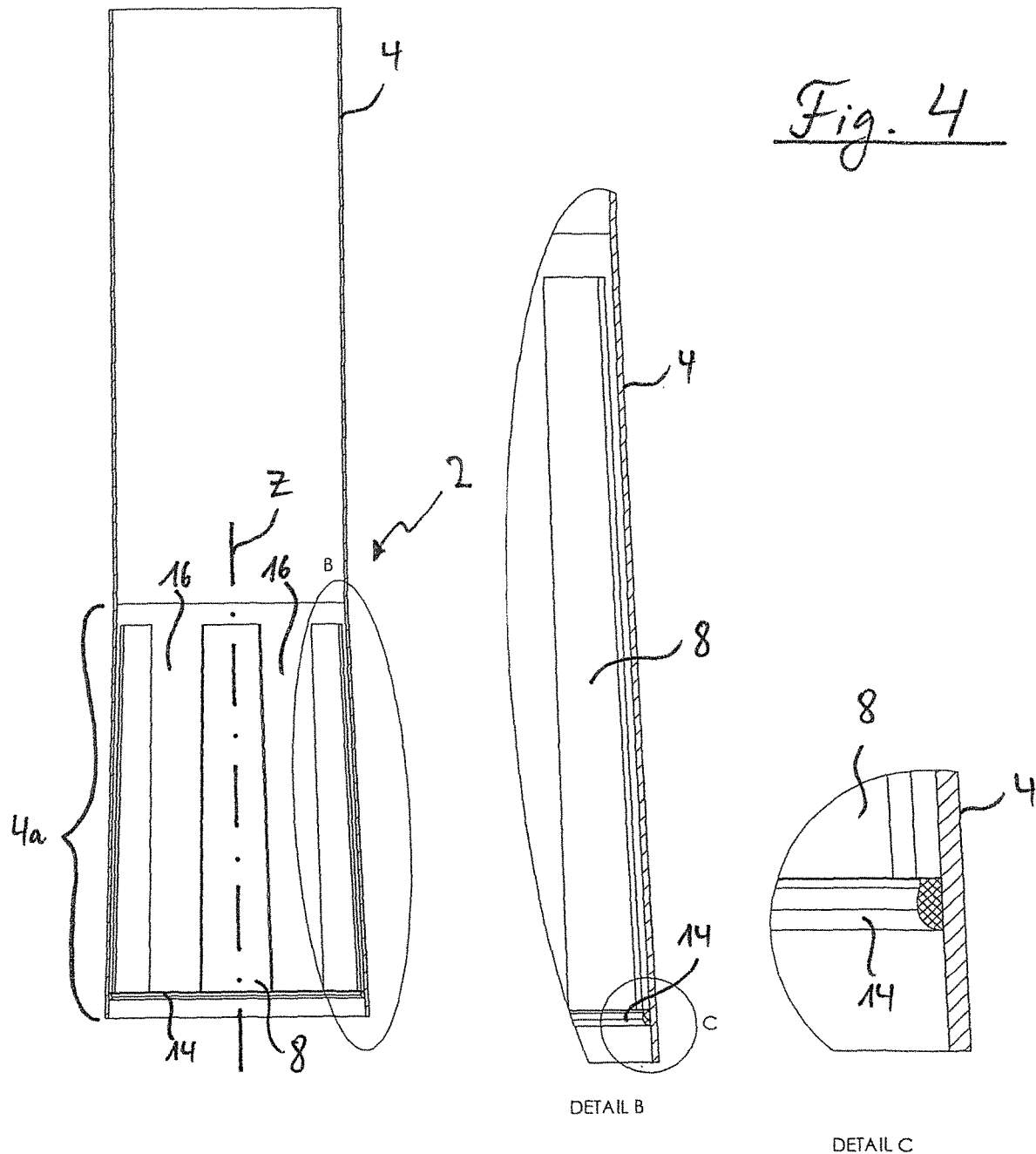

FIG. 4 shows a further embodiment of the seal arrangement 2 according to the invention, with a seal unit 8. FIG. 5 shows the seal unit 8 from FIG. 4, having a plurality of recesses 16 in the circumferential direction over the entire height portion 15 above the sealing element 14.

Figure 7:
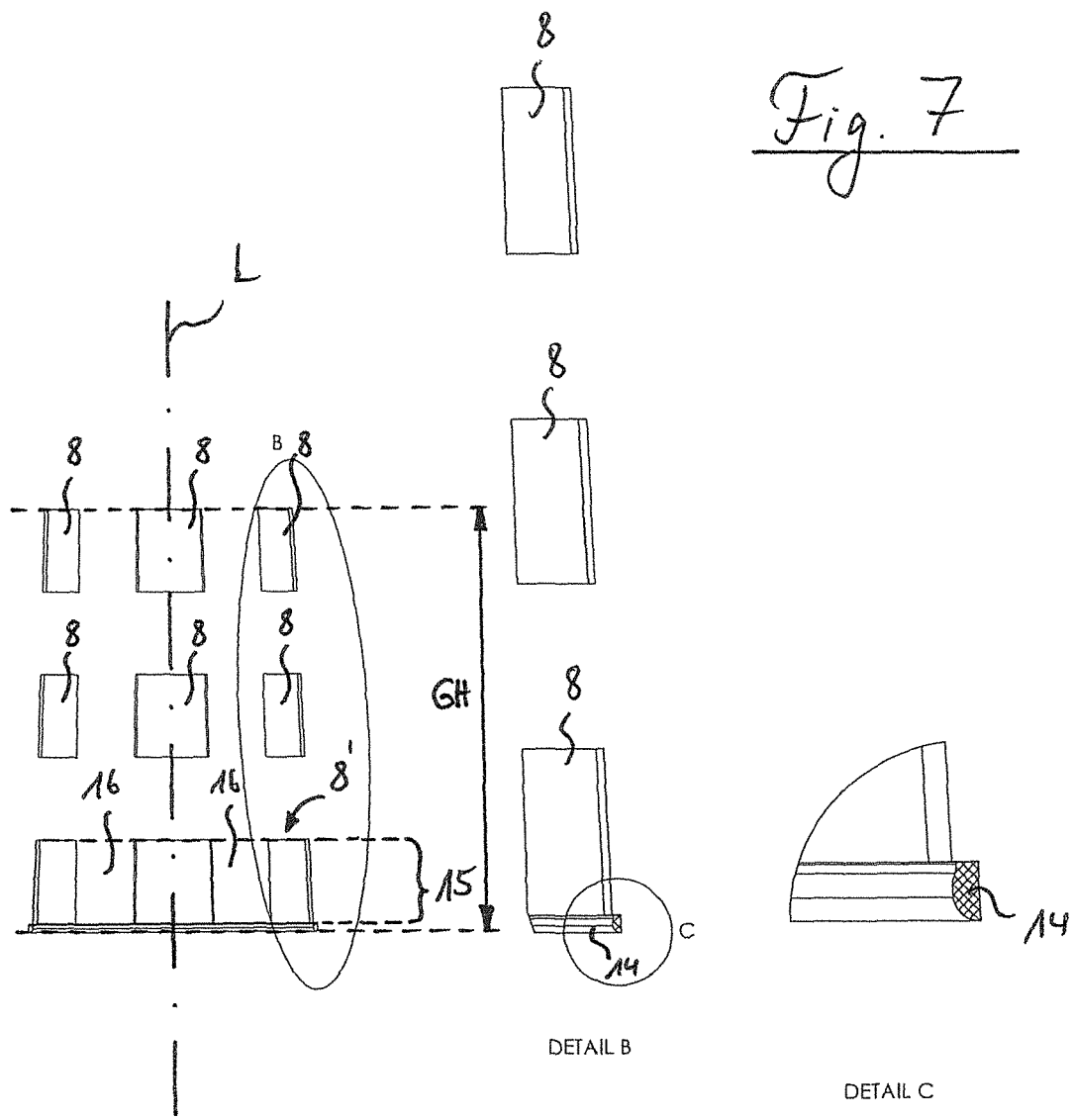

FIG. 6 also shows a further embodiment of the seal arrangement 2 according to the invention, with a multiplicity of mutually distanced seal units 8, which form a group of seal units. FIG. 7 shows the seal units 8, 8' from FIG. 6. The upper seal units 8 in this case realize segments of a hollow truncated cone, which in each case are mutually distanced in the circumferential direction with respect to the longitudinal central axis L of the upper joint element 4 and with respect to a direction parallel to the longitudinal central axis L. The lower seal unit 8' is distanced from the other seal units 8 in a direction parallel to the longitudinal central axis L, and comprises the sealing element 14 that extends around the entire circumference. Furthermore, the lower seal unit 8' has a plurality of recesses 16 in the circumferential direction in a height portion 15 above it. In addition, the total height GH of the group of sealing units is shown.

Figure 8:
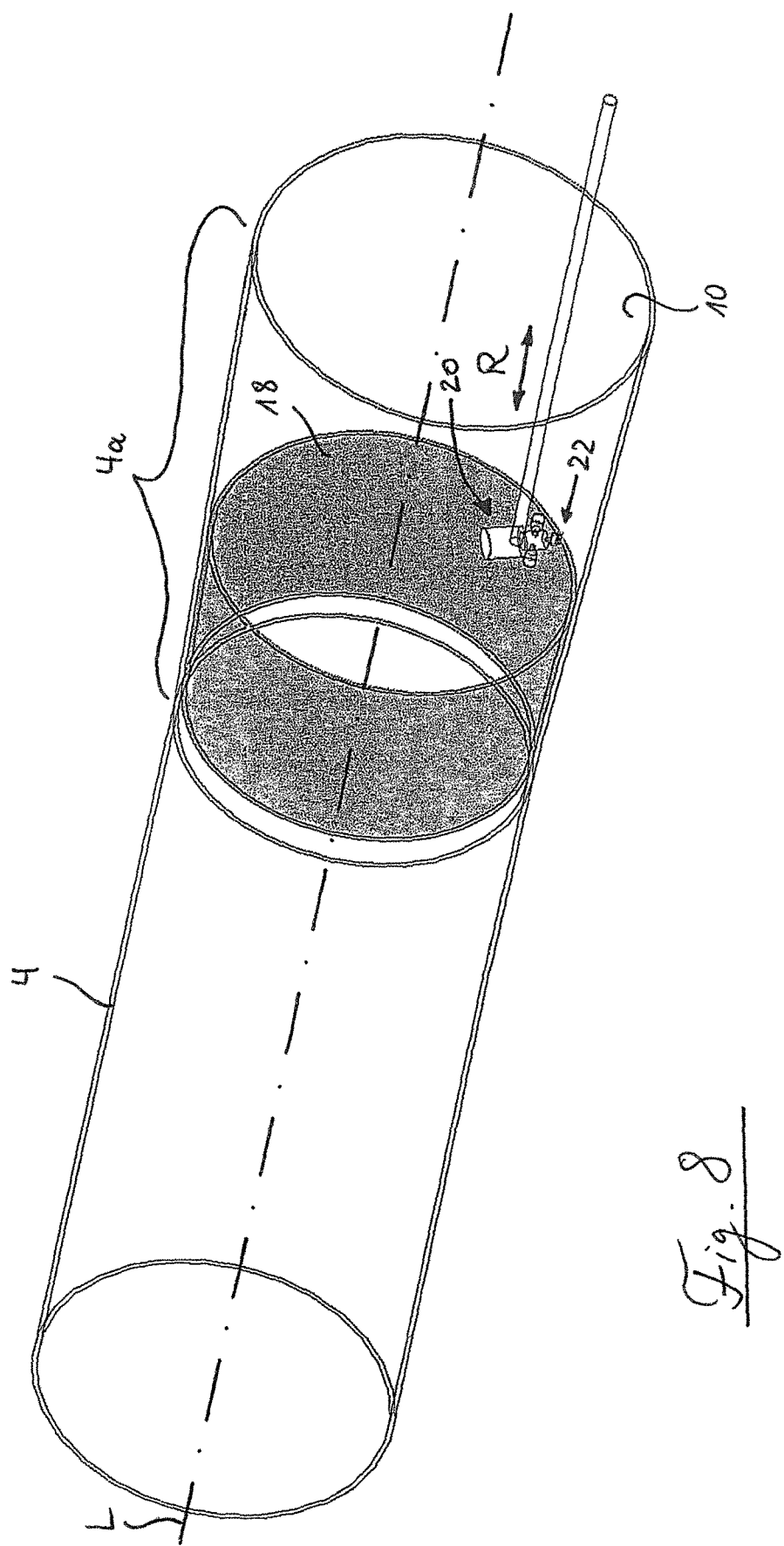
Figure 9:
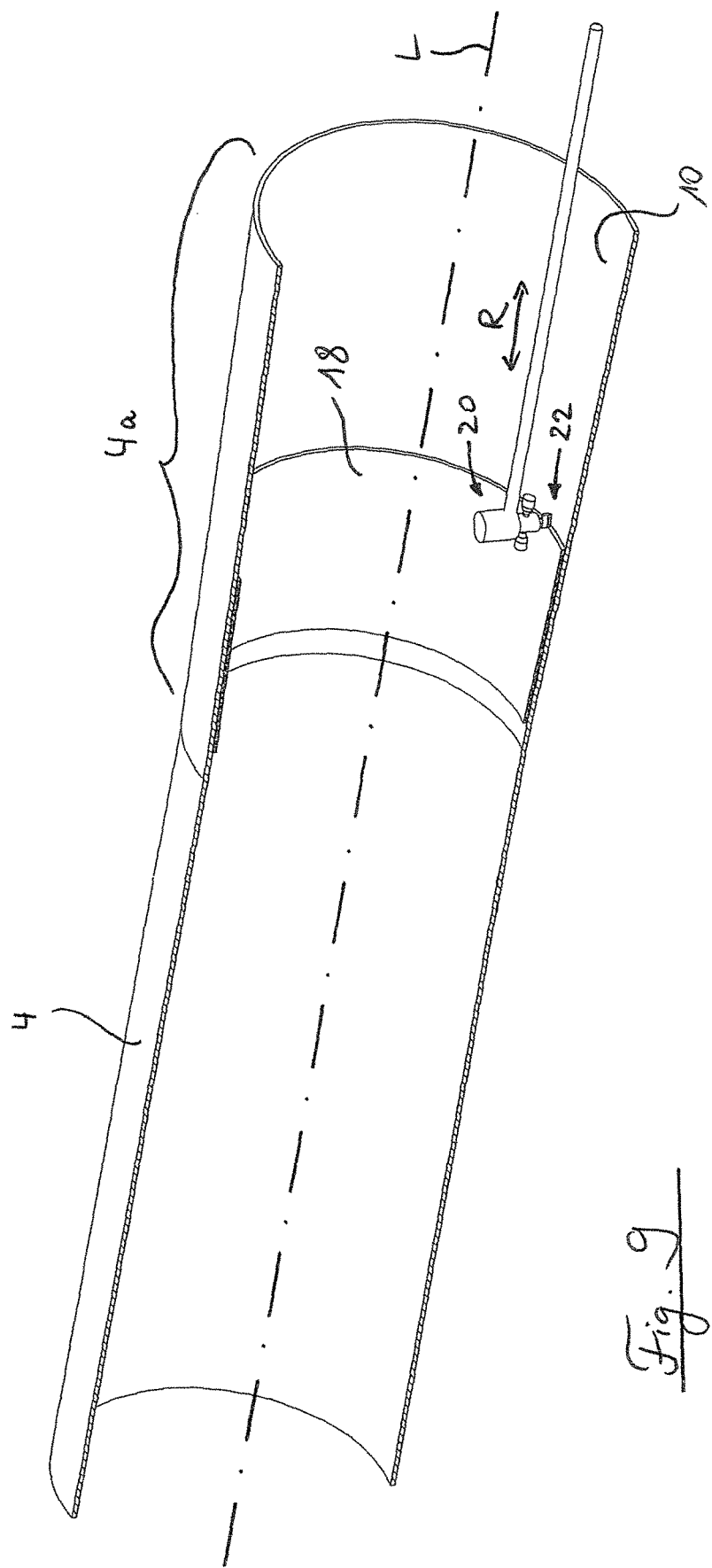

FIGS. 8 and 9 shows a step of a method according to the invention. In this case, a grouting compound 18 is poured onto the inner joint surface 10, by means of a grouting device 20, in the tapered portion 4*a* of the upper joint element 4. The upper joint element 4 in this case rotates about its longitudinal central axis L. The grouting device 20 has a slot-type grouting opening 22 that, when the grouting compound 18 is being applied, is located vertically beneath the longitudinal central axis L and above the joint surface 10. During the pouring operation, the grouting derive 20 is moved in a direction R perpendicular to the circumferential direction. This movement, in combination with the rotation of the joint element 4, causes the grouting opening 22 to execute a spiral movement relative to the joint surface 10. A particularly even, large-area and rapid application of the grouting compound 18 is thus achieved.

Figure 10:
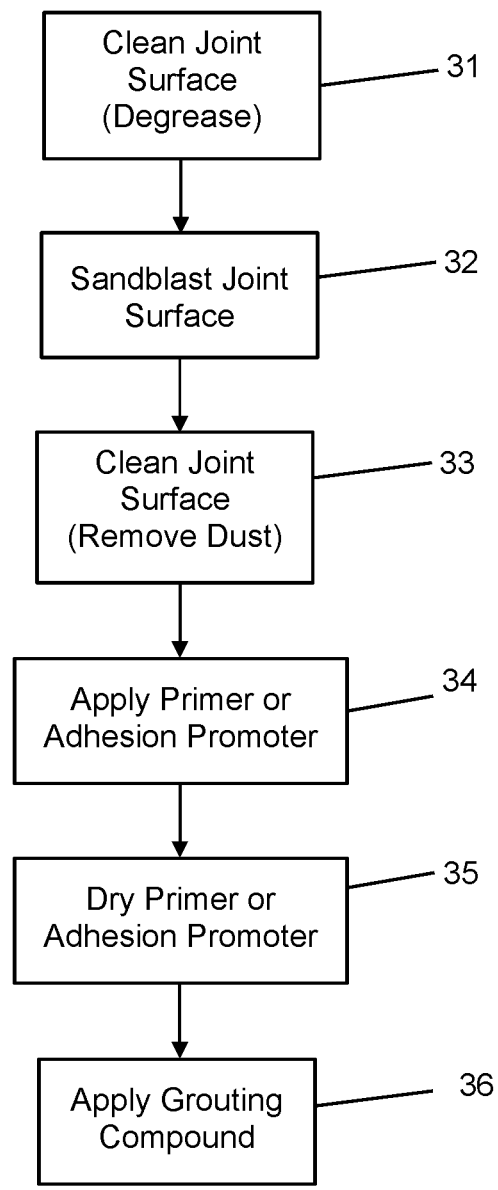

FIG. 10 shows a flow diagram of a method according to the invention, whereby, in a first step 31, the joint surface 10, 12 is cleaned, in particular degreased. In a second step 32, the joint surface 10, 12 is sandblasted. In a third step 33, the joint surface 10, 12 is cleaned again, and in particular cleaned of dust. In a fourth step 34, the adhesion promoter, or primer, is applied to the joint surface 10, 12. In a fifth step 35, the adhesion promoter, or primer, is dried and/or left to dry. And in a sixth 36 step, the grouting compound 18 is applied.

The invention claimed is:

1. A seal arrangement for a joint of two joint elements of an offshore structure in which, for the purpose of producing a stable joint, an upper offshore structure joint element and a lower offshore structure joint element are inserted into each other clamping at least one seal unit, comprising one of the upper or lower offshore structure joint elements and the at least one seal unit fixed to the upper or lower offshore structure joint element, the at least one seal unit being fixed to the upper or lower offshore structure joint element in such a manner that the at least one seal unit, in a joining position, is arranged between an inner joint surface of one of the upper or lower offshore structure joint element and an outer joint surface of the other of the upper or lower offshore structure joint element, the at least one seal unit being load-bearing without the use of grouting mortar, such that said at least one seal unit distances the upper and lower offshore structure joint elements in the joining position from each other and supports the upper offshore structure joint element, the at least one seal unit having at least one elastic sealing element, which extends in the circumferential direction around an entire circumference of the at least one seal unit and the thickness (D) of the at least one elastic sealing element is greater than the thickness (D') of an adjoining region of the at least one seal unit.

2. Seal arrangement according to claim 1, characterized in that the at least one seal unit has a thickness of from 5 mm to 75 mm, preferably 20 mm to 50 mm, particularly preferably 25 mm to 30 mm.

3. Seal arrangement according to claim 1, characterized in that the at least one seal unit is of a multilayer construction.

4. Seal arrangement according to claim 1, characterized in that the one or more sealing elements has/have a greater elasticity than the rest of the seal unit.

5. Seal arrangement according to claim 1, characterized in that the at least one seal unit is designed to be hydrolysis-stable and comprises one or more materials from the group polypropylene, polyethylene, polyoxymethylene, rubber, nylon, polyvinyl chloride, polyurea, polyurethane.

6. Seal arrangement according to claim 1, characterized in that the at least one seal unit comprises up to 50% of one or more fillers, preferably in the form of CaCO3, wollastonite, graphite and/or carbon black.

7. Seal arrangement according to claim 1, characterized in that the at least one seal unit adheres to the joint surface of at least one of the upper or lower offshore structure joint elements by means of an adhesion promoter.

8. Seal arrangement according to claim 1, characterized in that the at least one sealing element has a Shore A hardness of between 40 and 100.

9. Seal arrangement according to claim 1, characterized in that the at least one seal unit will withstand a compressive load of from 0.1 N/mm2 to 50 N/mm2.

10. Seal arrangement according to claim 1, characterized in that the at least one seal unit is composed of a plurality of seal segments arranged next to each other.

11. Seal arrangement according to claim 1, characterized in that the seal arrangement comprises at least two seal units that are distanced from each other.

12. Seal arrangement according to claim 1, characterized in that the at least one seal unit has at least one recess in the circumferential direction, in at least one height portion.

13. Seal arrangement according to claim 1, characterized in that the seal arrangement comprises a sensor arrangement for sensing the mechanical forces occurring in the seal arrangement.

14. The seal arrangement according to claim 1, wherein the upper and lower offshore structure joint elements are a monopile and a transition piece of the offshore structure.

15. A method for producing a seal arrangement according to any one of the preceding claims, for a joint of the upper and lower offshore structure joint elements, in particular realized as a monopile and a transition piece, of an offshore structure, preferably an offshore wind energy installation, in particular a substructure thereof, wherein a grouting compound is poured onto a joint surface of one of the upper or lower offshore structure joint elements and hardens to form the at least one seal unit.

16. A method for producing a seal arrangement, for a joint of an upper offshore structure joint element and a lower offshore structure joint element of an offshore structure, preferably an offshore wind energy installation, in particular a substructure thereof, wherein a grouting compound is poured onto a joint surface of one of the upper or lower offshore structure joint elements and hardens to form at least one seal unit adhered to the joint surface,
wherein the grouting compound is allowed to harden before one of the upper or lower offshore structure joint elements is inserted into the other of the upper or lower offshore structure joint elements, clamping the at least one seal unit between the upper and lower offshore structure joint elements.

17. The method of claim 16, comprising one or more of the following steps:
degreasing the joint surface of one of the upper or lower offshore structure joint elements;
sandblasting the joint surface;
removing dust from the joint surface;
applying a primer or adhesion promoter to the joint surface;
drying the primer or adhesion promoter; and/or
applying grouting compound to the joint surface.

18. The method of claim 16, comprising:
performing said step of applying the grouting compound while said one of the upper or lower offshore structure joint elements is rotated about its longitudinal central axis.

19. The method of claim 16, wherein said grouting compound includes two starting materials that are mixed together in an antechamber of a grouting device.

20. The method of claim 16, wherein the grouting compound comprises at least one thermoplastic starting material and the method comprises:
heating the at least one thermoplastic staring material in an antechamber of a grouting device to achieve a pourable state before the step of pouring the grouting compound.

21. The method of claim 16, wherein the hardened grouting compound forms an elastic sealing element.

* * * * *